US007728759B2

(12) United States Patent  
Tillotson et al.

(10) Patent No.: US 7,728,759 B2
(45) Date of Patent: Jun. 1, 2010

(54) SYSTEM AND METHOD FOR USING IRIDIUM SATELLITE SIGNALS FOR METEOROLOGICAL MEASUREMENTS

(75) Inventors: Brian J. Tillotson, Kent, WA (US); David A. Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/019,953

(22) Filed: Jan. 25, 2008

(65) Prior Publication Data

US 2009/0189802 A1 Jul. 30, 2009

(51) Int. Cl.
*G01S 13/95* (2006.01)
*G01S 13/00* (2006.01)
*G01S 7/28* (2006.01)

(52) U.S. Cl. ............... 342/26 A; 342/26 R; 342/26 B; 342/59; 342/175; 342/195; 702/1; 702/2; 702/3; 73/170.16; 73/170.28

(58) Field of Classification Search ...... 342/26 R–26 D, 342/59, 175, 192–197, 357.01–357.17, 350–356, 342/450–465; 702/1–3; 455/403, 422.1, 455/427–431, 7, 11.1, 12.1, 13.1, 13.2; 701/200, 701/207, 213–216; 73/178 R, 23.2, 29.01, 73/170.16, 170.28
See application file for complete search history.

(56) References Cited

U.S. PATENT DOCUMENTS

| | | | | |
|---|---|---|---|---|
| 3,171,126 A | * | 2/1965 | Wiley | 342/458 |
| 4,386,355 A | * | 5/1983 | Drew et al. | 342/357.01 |
| 5,410,728 A | * | 4/1995 | Bertiger et al. | 455/428 |
| 5,604,920 A | * | 2/1997 | Bertiger et al. | 455/428 |
| 5,675,081 A | * | 10/1997 | Solheim et al. | 73/170.28 |
| 6,067,852 A | * | 5/2000 | Alber et al. | 73/178 R |
| 6,720,916 B2 | * | 4/2004 | Christensen et al. | 342/357.05 |
| 6,731,906 B2 | * | 5/2004 | Sokolovskiy et al. | 455/12.1 |
| 7,365,674 B2 | * | 4/2008 | Tillotson et al. | 342/26 B |
| 7,400,293 B2 | * | 7/2008 | Fleming | 342/357.02 |
| 7,502,689 B2 | * | 3/2009 | Jakowski et al. | 702/2 |

(Continued)

OTHER PUBLICATIONS

D. Thoma, "Iridium NEXT Partnership in Earth Observation: Hosting Radio Occultation Sensors on Commercial Communications Satellite Constellations"; no publisher listed; no date listed; no place of publication listed.*

(Continued)

*Primary Examiner*—Bernarr E Gregory
(74) *Attorney, Agent, or Firm*—Harness, Dickey & Pierce, P.L.C.

(57) ABSTRACT

A method for obtaining weather related information for a portion of the Earth's atmosphere between a mobile platform traversing over a predetermined surface portion of the Earth, and at least one satellite from a satellite constellation. The method involves modifying at least one satellite from the constellation of satellites to include time and location information in wireless signals that are transmitted in real time by the one satellite. The mobile platform receives the wireless signals from the one satellite. An occultation system carried on the mobile platform analyzes the time and position information, in addition to location information pertaining to a real time location of the mobile platform, and to derive real time atmospheric weather related information for a geographic area between the mobile platform and the one satellite.

21 Claims, 6 Drawing Sheets

U.S. PATENT DOCUMENTS

| | | | |
|---|---|---|---|
| 2002/0155809 A1* | 10/2002 | Sokolovskiy et al. | 455/12.1 |
| 2002/0158794 A1* | 10/2002 | Christensen et al. | 342/357.05 |
| 2006/0121893 A1* | 6/2006 | Tillotson et al. | 455/431 |
| 2006/0229813 A1* | 10/2006 | Tobiska | 702/2 |
| 2007/0073486 A1* | 3/2007 | Tillotson et al. | 702/3 |
| 2007/0276598 A1* | 11/2007 | Tillotson | 701/213 |

OTHER PUBLICATIONS

E.R. Kursinski et al., "Active Temperature, Ozone and Moisture Microwave Spectrometer (ATOMMS)"; University of Arizona; Phoenix, Arizona; May 16, 2005.*

"Setting stars reveal planetary secrets"; no author listed; Nov. 5, 2007; posted on the Internet at www.esa.int, site of the European Space Agency.*

"The Iridium System"; no author listed; no date given; Iridium Satellite LLC; Bethesda, Maryland.*

T. Brinton, "Scientists Use GPS Signals to Measure Earth's Atmosphere"; Oct. 10, 2007; posted on the Internet at www.space.com.*

B. Lusignan et al., "Sensing the Earth's Atmosphere with Occultation Satellites"; Proceedings of the IEEE, vol. 57, No. 4, Apr. 1969; pp. 458-467.*

C.J. Fong et al., "GPS Radio Occultation and Mission Results from Formosat-3/Cosmic Spacecraft Constellation"; Third International Conference on Recent Advances in Space Technologies, 2007 (RAST 2007); Jun. 14-16, 2007; pp. 748-753.*

Ware, R., et al. "Real-Time Water Vapor Sensing with SuomiNet—Today and Tomorrow", International GPS Meteorology Workshop, Tsukuba, Japan, Jan. 14-16, 2003, pp. 1-6.

Coster, A. J. et al. "The Westford Water Vapor Experiment: Use of GPS to Determine Total Precipitable Water Vapor, " ION 52nd Annual Meeting, Cambridge, MA 19-21, Jun. 1996, 11 pages.

Thompson, D. R., et al. "Surface Roughness Estimation from GPS Sea Reflections", NASA Earth Science Enterprise, IEEE Geoscience and Remote Sensing Symposium, 2002, pp. 1-3.

Yuichi Aoyama; Shoji, T. Yoshihara; S. Danno, and T. Tsuda. Mountaintop GPS Observations: Downward Looking GPS Occultation Measurement on the Top of Mt. Fuji presented at Colloquium on Atmospheric Remote Sensing using the Global Positioning System, Boulder, Colorado, Jun. 20-Jul. 2, 2004, 27 pages. http://www.cosmic.ucar.edu/colloquium 2004/presentations/aoyama 23Jun04.pdf.

Yoshihara, T.; Fujii, N.; Hoshinoo, K.; Matsuaga, K.; Saitoh, S.; Sakai, T.; Toshitaka, T.; Aoyama, Y.; Danno, S. "Mesurement System of Airborne-Based GPS Downward-Looking Occultation and Experimental Results", research supported by Japan Ministry of Education, Culture, Sports, Science and Technology, XXVIIIth General Assembly of International Union of Radio Science (URSI), New Delhi, India, Oct. 2005, 4 pages. http://wvvvv.ursi.org/Proceedings/ProcGA05/pdf/F08.9(01156).pdf.

* cited by examiner

SYSTEM AND METHOD FOR USING IRIDIUM SATELLITE SIGNALS FOR METEOROLOGICAL MEASUREMENTS

CROSS-REFERENCE TO RELATED APPLICATIONS

This application is related in general subject matter to the following pending U.S. patent applications:

U.S. Ser. No. 11/003,868, filed Dec. 3, 2004, now U.S Pat. No. 7,598,901, entitled "SYSTEM FOR MEASURING TURBULENCE REMOTELY";

U.S. Ser. No. 11/235,371, filed Sep. 26, 2005, now U.S Pat. No. 7,365,674, entitled "AIRBORNE WEATHER PROFILER NETWORK";

U.S. Ser. No. 11/764,465, filed Jun. 18, 2007, entitled "WATER VAPOR VERTICAL PROFILE VIA GNSS REFLECTION";

U.S. Ser. No. 11/381,506, filed May 3, 2006, now U.S Pat. No. 7,343,793, entitled "ACOUSTIC PROFILER FOR WIND, TEMPERATURE, AND TURBULENCE"; and U.S. Ser. No. 11/420,531, filed May 26, 2006, now U.S Pat. No. 7,623,065, entitled "REFRACTIVITY RETRIEVAL VIA DIRECT MEASUREMENT OF GNSS BENDING ANGLE".

The disclosures of the above applications are incorporated herein by reference.

FIELD

The present disclosure relates to weather detection and measurement systems, and more particularly to a system and method that uses signal delays of a wireless signal transmitted by an IRIDIUM® satellite, and received by a mobile platform, to make atmospheric and/or oceanic measurements.

BACKGROUND

Various attempts have been made to remotely measure atmospheric variables used for weather prediction (e.g. temperature, humidity, and pressure) in inaccessible areas, such as over the Earth's oceans, using an aircraft. Previously developed systems make use of occultation and scattering of Global Navigation Satellite Systems (GNSS), for example signals using GPS, Glonass, and Europe's planned Galileo. The signals are used to calculate atmospheric water vapor content, temperature profiles, and ocean wave height and direction. The GNSS occultation method, while viable, in some instances may be limited in precision by the weakness of typical GNSS signals. GNSS occultation may also be limited in coverage by the relatively small number of GNSS satellites and their slow apparent motion across the sky.

One particularly important issue that must be dealt with when using GNSS satellites for weather predicting purposes is the sparse coverage afforded by GNSS occultation. Occultation measurements generally require that a GNSS satellite appear within a few angular degrees of the observer's horizon. If the satellite is too low, it may be occluded by the Earth. If it is too high, the signal's path through the atmosphere may not traverse the troposphere on its way to an aircraft flying at a cruise altitude. This can make the data obtained nearly useless for weather prediction.

The times when a GNSS satellite is near the Earth's horizon for any given aircraft are quite infrequent, and typically once an hour or so. Given that a jet aircraft typically covers about 1000 kilometers in an hour when travelling at a cruise altitude, the distance between occultation measurements is so large that they may give relatively little value for weather models.

A second important aspect is the relative weakness of GNSS signals. GNSS satellites are power-limited, so the strength of their signals is designed to be just barely adequate for a receiver to detect and track them under normal operating conditions. For navigation, "normal operating conditions" means the satellite is relatively high above the horizon and the receiver has up to a minute to achieve good synchronization to the signal. Thus, the signal is just strong enough to reach a typical mobile receiver after traversing a few miles of atmosphere. For meteorological measurements, however, the satellite should be near the horizon, so the signal would typically traverse hundreds of miles of atmosphere before arriving at the mobile receiver. In addition, for cases where the satellite is rising rather than setting, the receiver must synchronize to the signal in less than about a minute so that the receiver can make occultation measurements while the satellite is close to the horizon. With the low power signals of GNSSs, this requires large antennas and expensive receivers to be employed on an aircraft. These limitations would not be desirable for a weather predicting system that will be deployed using dozens, or possibly hundreds, of aircraft.

Still other ways of gathering water vapor data over the oceans, however, have all been subject to various limitations. Radiosondes may be sent out over the ocean, but these can be expensive to gather the frequency of data required. Currently, the National Weather Service (NWS) obtains information on the water vapor distribution from satellite information and from twice daily radiosonde launches at 93 sites around the continental U.S. (Coster, et al) The radiosonde network is expensive to operate. In addition to the expense, the balloons carrying the sonde packages take about an hour to reach the tropopause. Therefore, the atmospheric data obtained is not available for some time. Because there are not many radiosonde balloons available, the horizontal spatial density is too low, and time between launches too high, to observe rapid changes of the water vapor with time and position.

Marine vessels with suitable instrumentation may also be used in an attempt to collect atmospheric information. However, this method does not provide sufficient frequency of data and the vessels can be expensive to operate.

There presently is a NASA-funded program called "TAMDAR" that uses in-situ temperature, wind, and humidity measurements obtained by aircraft. This significantly improves weather forecasts over land areas where aircraft frequently ascend and descend through the troposphere. However, it has essentially no value over oceans. Over oceans the aircraft operate at cruise altitude, and thus well above the tropospheric phenomena that influence weather.

Satellite measurements over the oceans may reveal cloud formations and some limited data about temperature and humidity, but typically lack the vertical resolution needed for good forecasts.

Networks of GNSS receivers on land are typically unable to gather data for most of the Earth's surface, i.e. over the oceans. Poor tropospheric coverage over the oceans can lead to unreliable weather forecasts for the western United States, Western Europe, Australia, and occasionally Japan. Remote measurements of the troposphere using GNSS occultation from aircraft could improve this situation, but these measurements would still suffer from limited coverage and poor signal strength as discussed above.

The statements in this section merely provide background information related to the present disclosure and may not constitute prior art.

SUMMARY

The present disclosure relates to a method and system that makes use of signals from one or more satellites of the IRIDIUM® satellite constellation to assist in determining atmospheric weather related information. In one specific implementation a method is disclosed for obtaining weather related information for a portion of the Earth's atmosphere between a mobile platform traversing over a predetermined surface portion of the Earth, and at least one IRIDIUM® satellite from the IRIDIUM® satellite constellation. The method may include:

modifying at least one IRIDIUM® satellite from a constellation of IRIDIUM® satellites to include time and location information in wireless signals that are transmitted in real time by the one IRIDIUM® satellite;

using the mobile platform to receive the wireless signals from the one IRIDIUM® satellite; and using an occultation system carried on the mobile platform to analyze the time and position information, in addition to location information pertaining to a real time location of the airborne mobile platform, and to derive real time atmospheric weather related information for a geographic area between the airborne mobile platform and the one IRIDIUM® satellite.

In another implementation the operation of using the occultation system involves using a receiver that determines time delay information using the time and location information provided in the wireless signals received from the IRIDIUM® satellite. A processor is then used to analyze the time delay information generated by the receiver and to generate the atmospheric weather related information.

In various embodiments the mobile platform may comprise a jet aircraft or a marine vessel. In one embodiment wireless signals are received from a single IRIDIUM® satellite, while in another embodiment the mobile platform receives signals from at least two IRIDIUM® satellites.

The ability to use time and position information transmitted from IRIDIUM® satellites provides a significant benefit because the signal power of such signals is typically several hundred times that used for GNSS satellites. Also importantly, the IRIDIUM® satellite constellation has a greater plurality of satellites in low, fast moving orbits. As a result, any mobile platform that tracks IRIDIUM® satellites will be able to make atmospheric measurements with a significantly higher spatial and temporal sampling frequency, which will in turn correlate to even higher quality, more accurate atmospheric measurements.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
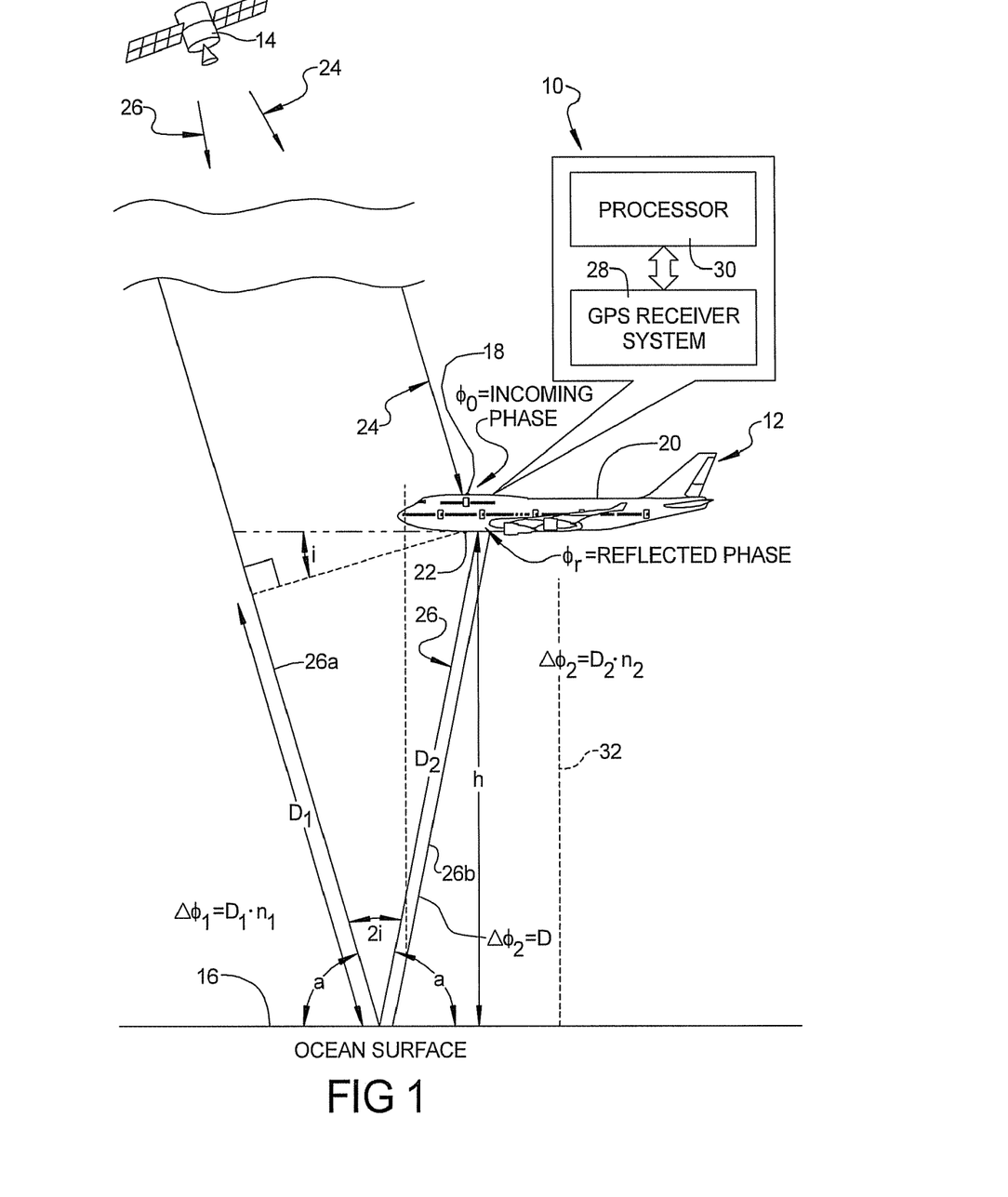
FIG. 1 is an illustration of a jet aircraft incorporating one embodiment of an occultation system as may be used with one embodiment of the present application, with diagrams indicating the direct and reflected GPS signals received from a GPS space vehicle.

Referring to FIG. 1, there is shown a system 10 employed on an airborne mobile platform, in this example a high speed jet aircraft 12, for using signals from a GPS space vehicle (i.e., satellite) 14 to measure the approximate refractivity profile of the atmosphere. The system of FIG. 1 thus represents one particular, advantageous way to perform signal occultation for the purpose of obtaining atmospheric weather related information. From the refractivity of the atmosphere, the precipitable water vapor (PWV) in the atmosphere may be determined, as well the temperature. It will be appreciated, however, that while an aircraft 12 is illustrated as the airborne mobile platform, it is possible that other airborne vehicles, possibly unmanned airborne vehicles, rotorcraft or even balloons could potentially be used. Also, while explanation of the subject matter of the present disclosure will be made with reference to an "ocean", it will be appreciated the system 10 and the various methodologies for implementing it are equally applicable over smaller bodies of water, such as lakes or seas, as well as over land. However, the various embodiments and methodologies of the present disclosure are expected to find particular utility for providing highly useful weather information over large bodies of water.

Referring further to FIG. 1, the aircraft 12 is operating at a known altitude (based on on-board navigation equipment) above an ocean 16. The aircraft 12 includes a first antenna 18 mounted on a crown, or adjacent a crown, of the fuselage 20 of the aircraft. A second antenna 22 is mounted at or adjacent to an undersurface of the fuselage 20. The first antenna 18 is used to receive GPS signals 24 directly from the GPS satellite 14 while the second antenna 22 receives GPS signals 26 reflected from the surface 16a of the ocean 16.

The system 10 includes a GPS receiver system 28 in communication with a processor 30. The GPS receiver system 28 is also in communication with both antennas 18 and 22. In general operation, the GPS receiver system 28 receives the direct and reflected GPS signals 24,26 and outputs the signals to the processor 30. Using the direct and reflected GPS signals 24,26, the processor 30 determines phase difference information between the signals. The determined phase difference information is used by the processor 30 to determine an average refractivity of the air (i.e., atmosphere) between the aircraft 12 and the ocean surface 16a. From the determined refractivity, and using additional algorithms to be described in the following paragraphs, the processor 30 is able to determine the PWV for a column 32 of the atmosphere between the ocean surface 16a and the aircraft 12.

Specific GPS frequencies that may be used with the present system 10 are both the L1 and the L2 frequencies. The L1 carrier is 1575.42 MHz and carries both the status message and a pseudo-random code for timing. The L2 carrier is 1227.60 MHz and is used for the more precise military pseudo-random code.

In FIG. 1, the reflected phase, $\phi_r$, is equal to:

$$\Phi_r = \Phi_o + \Delta\Phi_1 + \Delta\Phi_2 \qquad \text{Equation 1}$$

where $\phi_0$=phase of incoming GPS signal 24 being directly received by the aircraft 12; (Equation 1a)

where $\Delta\Phi_1 = D_1 * n_1$ =change in phase of the incoming GPS signal 26a along distance $D_1$; (Equation 1b); and where $\Delta\Phi_2 = D_2 * n_2$ =change in phase of the incoming GPS signal portion 26b along distance $D_2$.

In this case the phase has units of radians. This can be interpreted as an optical path along a physical distance, for example the physical distance separating the GPS satellite 14 and the aircraft 12. The number of wavelengths within this distance varies when the index of refraction, "n", varies. As n increases, the number of wavelengths that can fit within this distance increases without changing frequency. Thus, the measurement is an effective phase shift which has units of radians as shown in Equation 2 below:

$$\phi = 2\pi L n / \lambda \qquad \text{Equation 2}$$

For a ground-based receiver, the excess path length that the GPS signal must travel when the GPS satellite 14 is at its zenith relative to the receiver (due to changes in the index of refraction) is given by Equation 3, where refractivity, N(r), is related to the index of refraction n by $N=10^6(n-1)$. The limits of integration are expressed as $r_s$ and $r_a$ where, $r_s$ is the geodetic radius of the Earth's surface and $r_a$ is the geodetic radius of the top of the neutral atmosphere (i.e., the "neutral" atmosphere being the portion of the Earth's atmosphere below the ionosphere).

$$\Delta r = 10^{-6} \int_{r_s}^{r_a} N(r) \, dr \qquad \text{Equation 3}$$

The term Δr can be measured as GPS phase shift relative to the theoretical phase assumed if the Earth had no atmosphere. Equations for predicting Δr when a GPS satellite is not at zenith are known in the art.

Some meteorologists use Δr to help predict the weather using computer models. However, when h (aircraft 12 altitude) is approximately equal to $r_a$, not much is learned by meteorologists from Δr looking upwards (above the aircraft 12). Therefore, it is necessary to consider the signal reflected from the ocean surface 16a.

An empirical formula can be used to calculate the refractivity of a parcel of air as shown in Equation 4. In this formula "T" is the temperature in Kelvin, "$p_d$" is the partial pressure of dry air, "$p_v$" is the partial pressure of water vapor, "$Z_d$" is the inverse compressibility factor for dry air and "$Z_w$" is the inverse compressibility factor for wet air. The constants "$k_1$", "$k_2$" and "$k_3$" are empirically determined.

$$N = k_1 \left(\frac{p_d}{T}\right) Z_d^{-1} + \left[k_2 \left(\frac{p_v}{T}\right) + k_3 \left(\frac{p_v}{T^2}\right)\right] Z_w^{-1} \qquad \text{Equation 4}$$

This formula can also be expressed in Equation 5 below with the constants determined as:

$$(n-1) \times 10^6 = N = 77.6(p_d/T)Z_d^{-1} + 64.8(e/T)Z_w^{-1} + 3.776 \times 10^5 (e/T^2) Z_w^{-1} \qquad \text{Equation 5}$$

An average PWV measurement can be calculated for the column of air below the altitude of the aircraft by determining $n_2$ (the average refractivity over the distance D2, discussed further below) from the phase shift difference between the two signals. With the quantity $n_2$, Equation 5 can be used, with tomographic algorithms, to determine the partial pressure of the water vapor, $p_v$.

The system 10 may also be able to determine the needed phase change between the two GPS signals 24,26 by measuring the Doppler shift between the two signals rather than the absolute phase difference. In this instance the angular velocity of the signals relative to the Earth would need to be different. The general results will be approximately the same, however, although the Doppler shift may be computationally easier to measure.

The total distance traveled by the incoming GPS signal 26 is represented by length 26a, between the GPS satellite 14 and the surface of the ocean 16, and by length 26b, which is the reflected portion between the ocean surface 16a and the aircraft 12. This total distance can be represented by the following equations, where $D_2$ (Equation 6a) represents length 26b and $D_1$ (Equation 6b) represents length 26a:

$$D_2 = \frac{h}{\sin\alpha} \qquad \text{Equation 6a}$$

and (2)

$$D_1 = \frac{h \cos(2i)}{\sin\alpha} \qquad \text{Equation 6b}$$

The reflected signal 26b will travel the additional distance $D_1$ and $D_2$ before being received by the antenna 22 on the bottom of the aircraft 12. The quantities $D_1$ and $D_2$ are known from the aircraft's 12 altitude and the GPS satellite 14 elevation angle relative to the aircraft. An average refractivity measurement can be calculated for the column of air 32 below the altitude of the aircraft 12 by determining $n_2$ from the phase shift difference between the two signals 24 and 26. The quantity $n_2$ is the average over the distance $D_2$ and $n_1$ is the average over the distance $D_1$.

Figure 2:
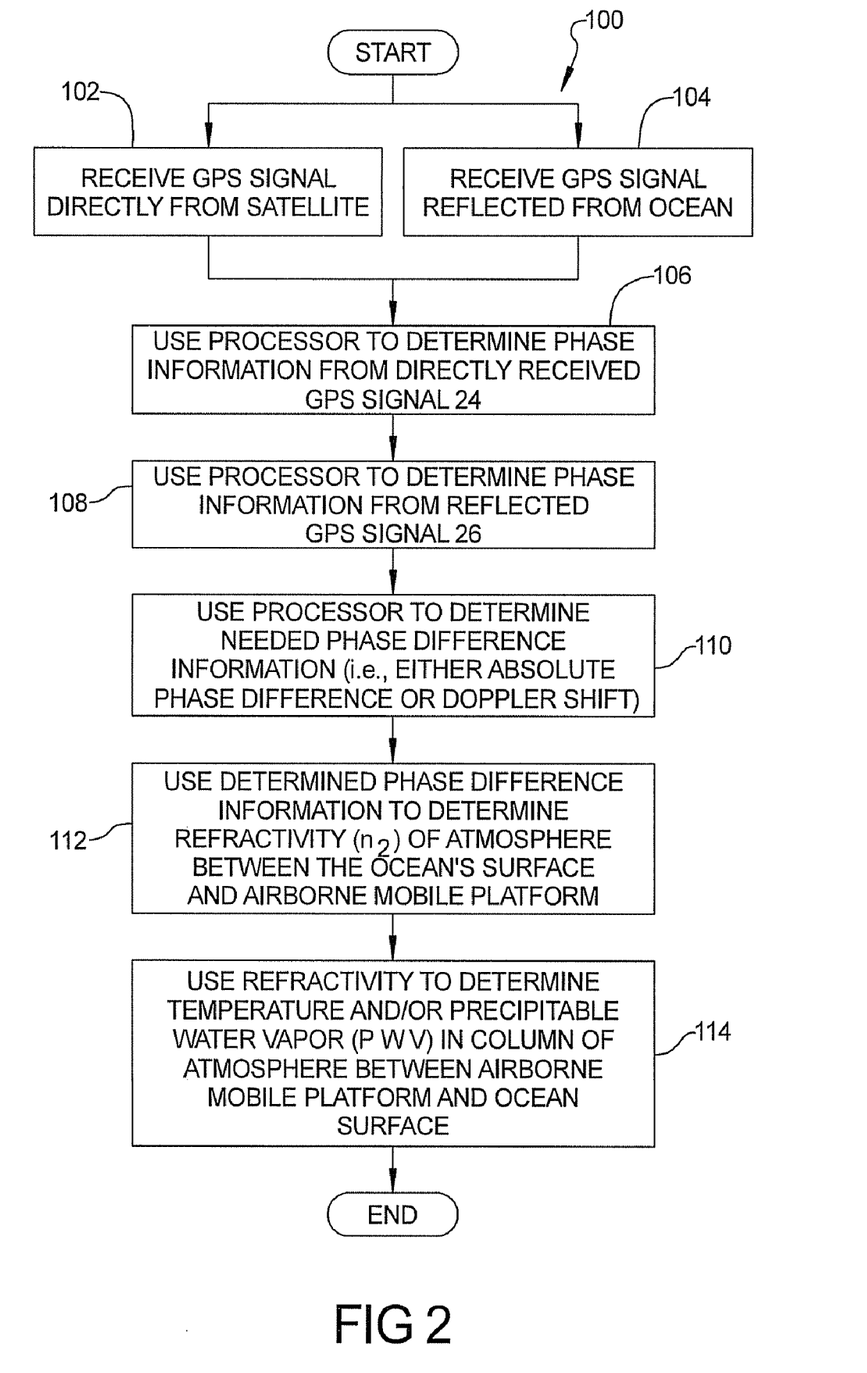
FIG. 2 is flowchart illustrating basic operations performed by a processor of the system of FIG. 1 in obtaining and analyzing the GPS signals to determine refractivity of a column of the atmosphere between the aircraft and ocean surface.

Referring to FIG. 2, a flowchart 100 is illustrated that summarizes the major operations described above. At operations 102 and 104 the GPS signals 24 and 26 are received by the GPS receiver system 28. At operation 106 the processor 30 uses the directly received GPS signal 24 to determine phase information associated with the signal 24. At operation 108 the processor similarly uses the reflected GPS signal 26 to determine phase information associated with the signal 26. At operation 110 the processor 30 uses the phase information obtained from GPS signals 24 and 26 to determine the needed phase difference information (i.e., either an absolute phase difference or a Doppler shift). At operation 112 the phase difference information is used to determine the refractivity ($n_2$) of the air near the ocean surface 16a. At operation 114 the refractivity of air near the ocean surface 16a is used with a tomographic algorithm to determine the PWV of the column 32 between the ocean surface 16a and the aircraft 12.

The measurement of $n_2$ assumes the ocean surface 16a is a flat surface. This is often not the case, so in one embodiment the system 10 and methodology of the present disclosure may use a model for the reflection of electromagnetic radiation from waves on the ocean's surface 16a to obtain even more accurate phase information from the reflected GPS signal 26. This model corrects the apparent radius $r_s$ of the ocean surface 16a to account for waves. For example, researchers have developed a general bistatic scattering model that yields the cross section for the specular and resonant reflections of GPS signals from an ocean's surface. See, for example, Thompson, D. R. et. al., "Surface Roughness Estimation from GPS Sea Reflections," NASA Earth Science Enterprise, IEEE Geoscience and Remote Sensing Symposium, 2002, which is hereby incorporated by reference into the present application. The scattering model predicts the behavior of a GPS signal reflected from ocean waves, and particularly changes in $\phi_1$ and $\phi_2$ due to different reflective strengths of wave troughs and peaks.

Figure 3:
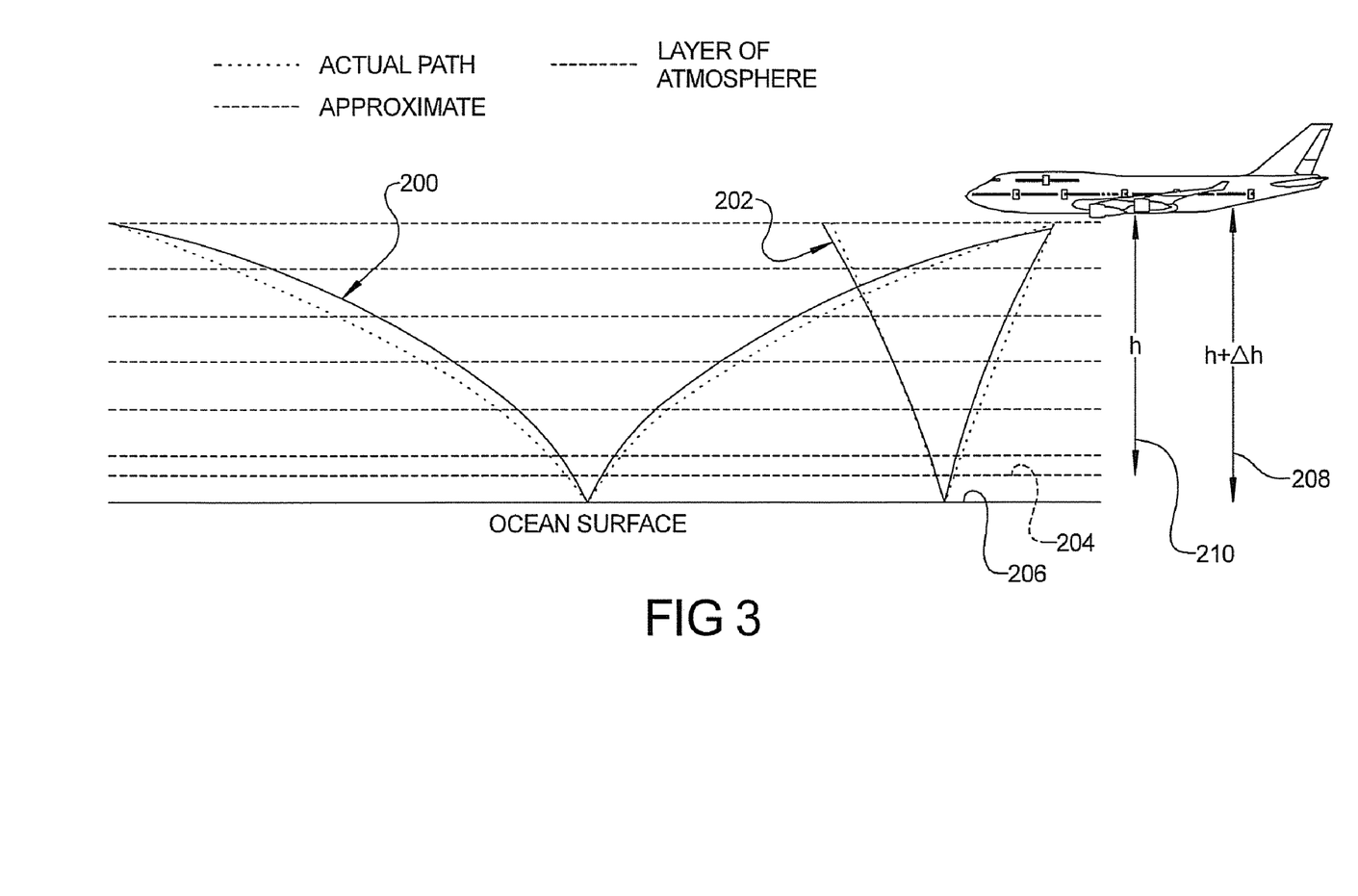
FIG. 3 is a simplified side diagrammatic view illustrating how two reflected GPS signals reflected at different angles to the aircraft can be used to gauge and account for the effect of variations in ocean height that might affect the phase of the reflected signal being used for the refractivity determination.

Finally, the signal reflection measurement for the reflected GPS signal 26 may also benefit from corrections for sea level changes due to tidal variations and the local air pressure. It will be appreciated that high air pressure depresses the local ocean surface 16a. These corrections may be determined by comparing the phases of two separate incoming, reflected signals arriving at different angles from the vertical, e.g. signals from two GPS satellites. The signal at the lower angle gets refracted more for a given mean value of n, so it effectively travels a longer overall path to the aircraft 12. From two phase measurements at different elevation angles, values for the quantity h+Δh and the average refractivity, $n_2$, can be determined. This is explained with reference to FIG. 3. FIG. 3 shows a diagram of the nominal, approximate signal path compared to the actual path for two different incoming GPS signals 200 and 202, which impinge the ocean surface at two different elevation angles. In this example the changing level of the ocean surface is represented by reference numerals 204 and 206. The atmosphere may be modeled as several layers (represented by horizontal dashed lines in FIG. 3) where each layer has a different index of refraction (n). The first GPS signal 200 enters the atmosphere at a relatively low (grazing) elevation angle. The path from the second signal 202 is represented by the lines coming in at a more vertical angle. For the elevation angle of each incoming GPS signal 200 and 202, there is the actual path traveled by the signal and the approximate path (i.e. the path with a nominal refractivity profile). For signal 200 with the lower elevation angle, there is more error in the approximate path (denoted by dots) due to greater refraction through the various layers of the atmosphere. Signal 202, having a higher elevation angle, experiences less refraction (i.e., the dots denoting the approximate path are more closely in line with the actual path traveled by the signal). Therefore, the approximate signal is closer to the actual path. The altitudes from the ocean to the aircraft are h+Δh (denoted by reference numeral 208 and h (represented by reference numeral 210), respectively. Using the principles in FIG. 3, the system 10 and its methodology may find the average index of refraction n that gives the integrated phase shift shown in Equation 3.

The system 10 can also minimize horizontal drift of the measurement point during each set of measurements. Conventional airborne GNSS occultation requires observing a single GNSS satellite as it moves through several degrees of elevation near the horizon. It is known that such a measurement point can drift by as much as 450 km during one occultation. This drift (which may also span through potentially different weather conditions) is the major source of error for standard GNSS occultation.

Figure 4:
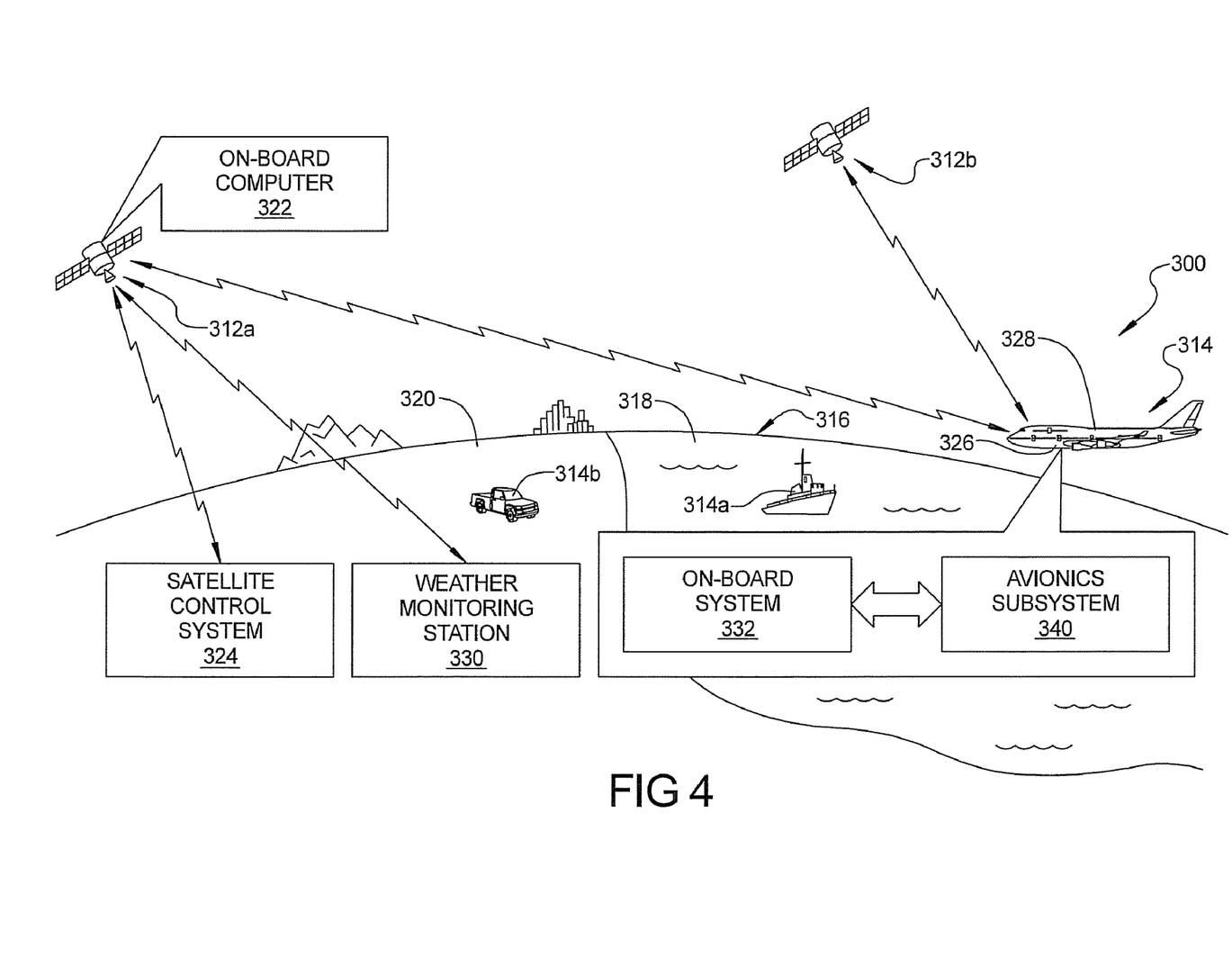
FIG. 4 is a diagrammatic view of one embodiment of the present disclosure that employs IRIDIUM® satellites that transmit modified wireless signals including time and position information to a mobile platform, and where the mobile platform has an occultation system adapted to use the modified IRIDIUM® signals for occultation purposes.

Referring now to FIG. 4, a system 300 in accordance with another embodiment of the present disclosure will be described. The system 300 uses any suitable signal occultation technique, for example the techniques described above in connection with FIGS. 1-3, but instead uses signals from satellites belonging to the IRIDIUM® satellite constellation. The IRIDIUM® satellites, which are typically configured to transmit signals suitable for mobile telephone service, are initially modified so that they transmit signals that include time and location data as well. More specifically, each IRIDIUM® satellite in the IRIDIUM® satellite constellation is configured to transmit a GNSS-type signal: a highly steady state frequency signal with a first embedded data field that describes the orbital elements of the satellite, and a second embedded data field that marks a specified time, e.g., every one second. As will be understood by those skilled in this art, the Cartesian orbital elements, also called the "orbital state vector", define the satellite's 3D position, its 3D velocity vector, and the time at which the position and time are measured. These seven numbers are all that is needed to calculate the satellite's position at earlier or later times. The time (also know as "epoch") is often implicitly equal to some agreed reference value and therefore omitted from the transmitted data. Thus, two important information components, those being location and time, are available for use in performing signal occultation.

Referring further to FIG. 4, a plurality of IRIDIUM® satellites 312a and 312b are shown in communication with a mobile platform 314. However, it will be appreciated that all of the satellites of the IRIDIUM® constellation are available for communication with the mobile platform, and that for convenience only two such satellites have been illustrated. In practice, the IRIDIUM® satellite constellation is comprised of 66 satellites that have fast, low Earth orbits about the Earth 316. In the illustration of FIG. 4 the mobile platform 314 is shown as an airborne mobile platform, and more specifically a jet aircraft flying over a large body of water 318 on the Earth 316.

While the present system 300 is particularly useful for taking atmospheric measurements over water (where various other types of systems are not able to operate), it will be appreciated that the system 300 could just as easily be used over land masses to obtain atmospheric related data. Also, while the mobile platform 314 is shown as a jet aircraft, the measurements could just as readily be obtained by a high speed unmanned air vehicle, a marine vessel 314a, or even a land vehicle 314b (provided the atmospheric measurements are over a body of land 320). A jet aircraft, because of the speed at which at can travel (typically 500 MPH-600 MPH while at cruise altitudes), is particularly advantageous because it can traverse a large area within a short amount of time, and thus can obtain highly current atmospheric information across a large geographic region.

Referring further to FIG. 4, each IRIDIUM® satellite 312a and 312b, includes an onboard computer 322 that can be programmed via wireless signals transmitted from a terrestrial satellite control system 324 so that it is configured to provide the time and location data described above. Each satellite 312a and 312b transmits wireless signals that are available for reception by any of the mobile platforms 314, 314a and 314b. For convenience, only the operation of airborne mobile platform 314 will be described, with it being understood that the operation of the mobile platforms 314a and 314b is essentially identical to that of mobile platform 314a.

The mobile platform 314 includes at least one antenna 326, and alternatively a second antenna 328. One antenna, such as antenna 326, may be located on a lower, downwardly facing portion of the fuselage of the mobile platform 314 so as to be able to receive reflected wireless signals. The second antenna 328 may be located on the crown of the fuselage of the mobile platform 314. Both antennas 326,328 are in communication with an onboard system 332 carried by the mobile platform 314. The second antenna 328 may be used for occultation purposes and/or to transmit atmospheric weather related information calculated by the onboard system back to one of the satellites 312a,312b. The satellite 312a or 312b may then be used to transpond the information back to a terrestrial weather monitoring station 330. Alternatively, the mobile platform 314 may transmit the calculated atmospheric information directly to other mobile platforms.

The power level of the signals transmitted by the IRIDIUM® satellites 312a, 312b is typically about 300 times stronger than those transmitted by various GNSS satellites (e.g., GPS and Glosnass). This reduces the time for the mobile platform 314 to synchronize to the IRIDIUM® satellite signals by a factor of about 300. This solves the challenge of making atmospheric measurements while using signals from a satellite that is rapidly rising on the Earth's horizon. The dramatically stronger signals provided by the IRIDIUM® satellites 312a, 312b also yields a significantly better signal-to-noise ratio. This allows a receiver of the mobile platform 314 to track the signal's phase and amplitude even more precisely, and thereby improves the resolution of atmospheric measurements. The IRIDIUM® satellites 312 also travel considerably faster that GNSS satellites. IRIDIUM® satellites move at about 7400 meters per second in low Earth orbits, while GPS satellites move at about 3880 meters per second. With 66 IRIDIUM® satellites in orbit, from any point on the Earth 316 a receiver can track at least one IRIDIUM® satellite 312 rising and setting every ten to fifteen minutes. This is several times more frequent than what can be accomplished with GNSS satellites. Therefore, the mobile platform 314 will be able to make atmospheric measurements with a significantly higher spatial and temporal sampling frequency, and thus provide even better geographic coverage during a given flight.

Figure 5:
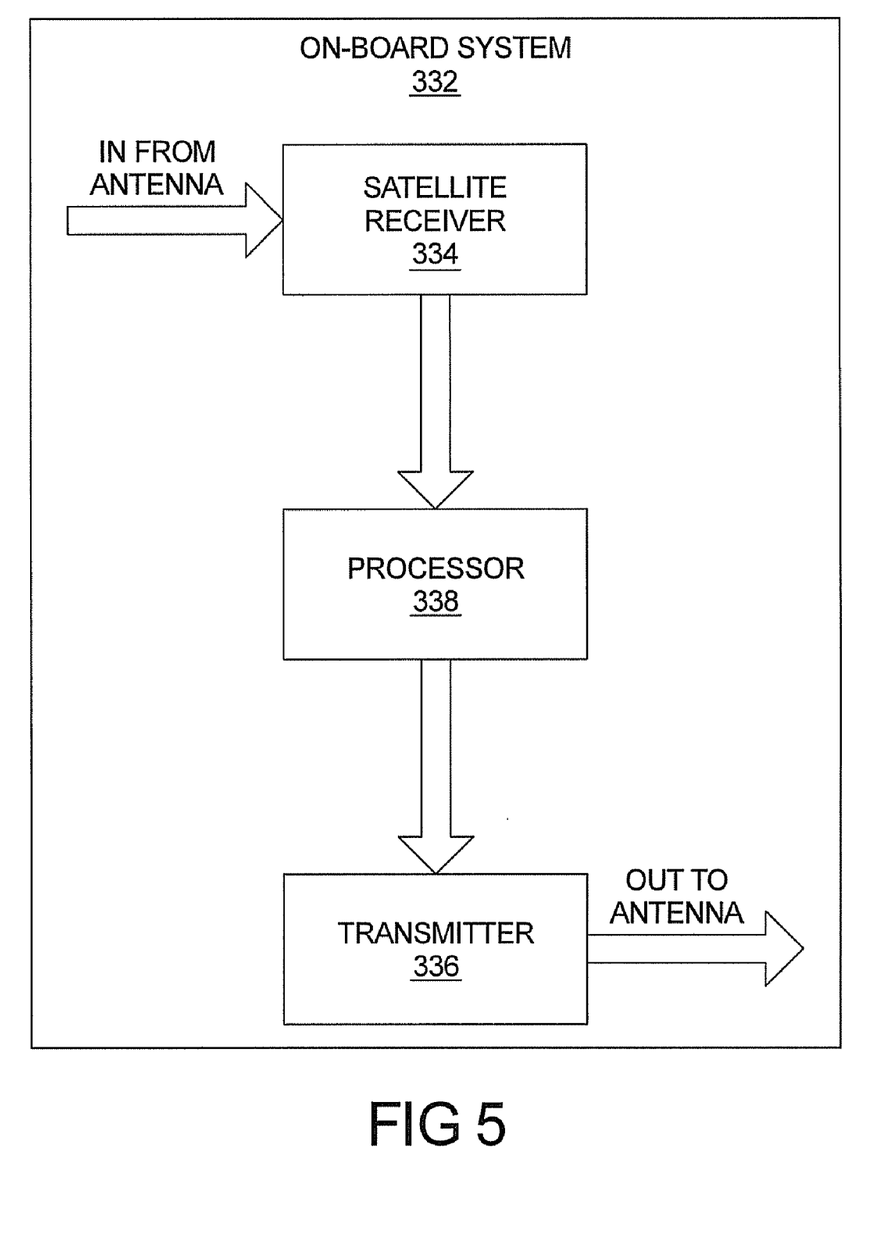
FIG. 5 is a high level block diagram of the components of the onboard system used by the mobile platform in FIG. 4.

Referring to FIG. 5, the onboard system 332 is shown in greater detail. The onboard system 332 includes an IRIDIUM® receiver 334 and a transmitter 336 that are both in communication with a processor 338. The IRIDIUM® receiver 334 is an electromagnetic wave receiver that is configured to receive the modified IRIDIUM® waveform (i.e., signal) that is transmitted by the IRIDIUM® satellites 312a, 312b, and possibly also other GNSS signals as well. The IRIDIUM® receiver 334 has its output coupled to the processor 338. The processor 338 uses the time and location information included in the received IRIDIUM® satellite signals to perform conventional occultation computations, conventional ocean surface scattering computations, or any other computations that generate atmospheric information useful for weather prediction/monitoring purposes. The time information from the IRIDIUM® satellites 312a,312b enable the IRIDIUM® receiver 334 to determine the time delay (i.e., phase shift) information that is important in occultation computations. Together, the IRIDIUM® receiver 334 and the processor 338 may be viewed as an "occultation system". The mobile platform 314 will also typically include an onboard avionics subsystem 340 that provides location and altitude information pertaining to the mobile platform 314 itself. This information may also be used by the processor 338 in specifying the geographic location of calculated atmospheric information.

The occultation calculations carried out by the processor 338 may be performed in accordance with the techniques and methodologies described herein in connection with FIGS. 1-3, or in accordance with any other known occultation methodologies. The use of IRIDIUM® satellite signals is expected to enhance the usefulness and accuracy of virtually any occultation system that relies on signals transmitted from orbiting satellites for the data/information it uses in its occultation computations to generate temperature, humidity and atmospheric pressure information. The ability of the system 300 to obtain such information over large bodies of water (i.e., oceans and seas) is expected to provide a significant advance in predicting weather patterns over large bodies of water, as well as weather patterns that are likely to affect coastal areas of the United States, Japan, Australia, etc. The system 300 is expected to find utility in both military and non-military applications where obtaining weather related information is important. Furthermore, the use of IRIDIUM® satellite signals is expected to further enhance the efficacy of systems that are used to remotely detect air turbulence in a flight path of a mobile platform.

Figure 6:
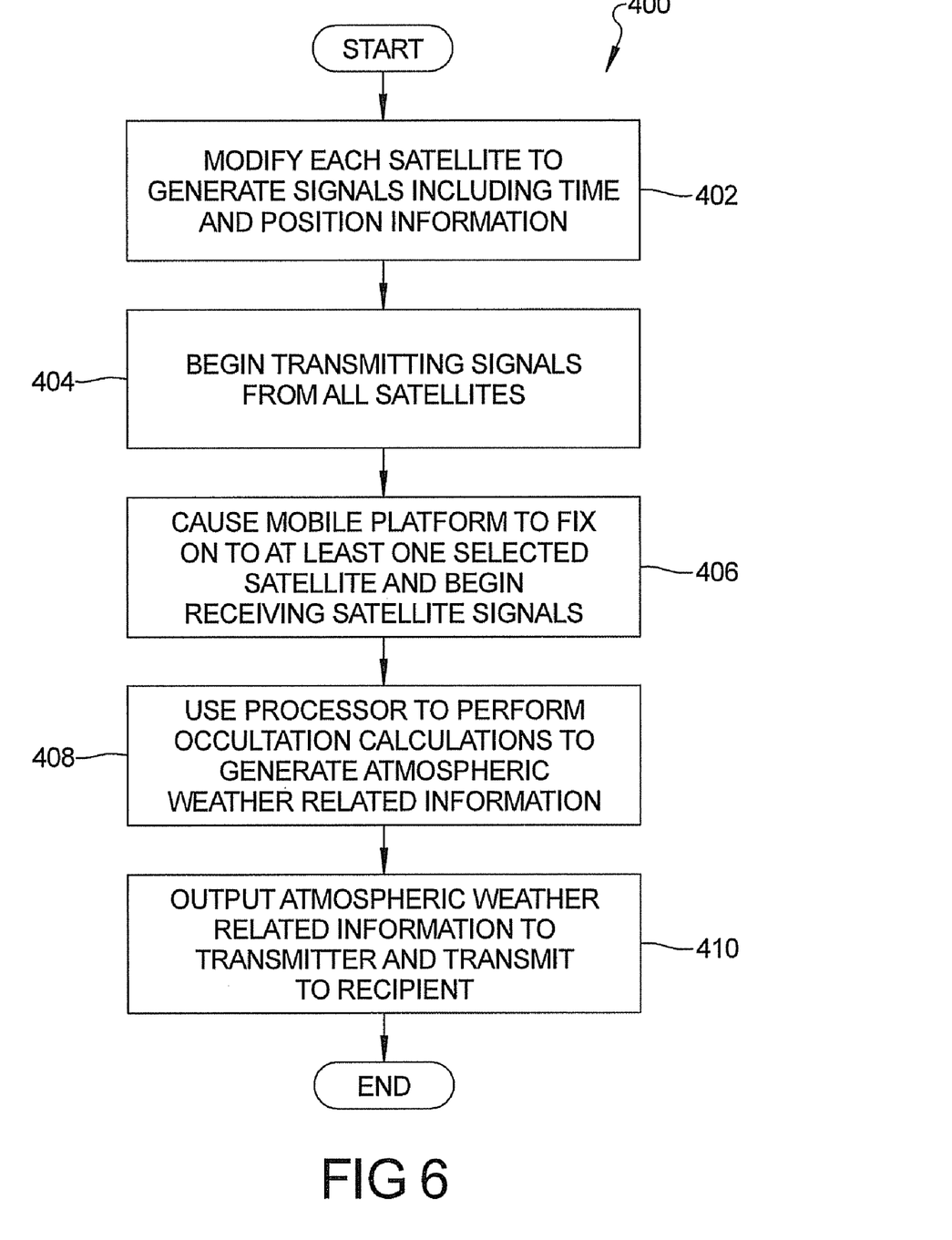
FIG. 6 is a flow chart illustrating major operations performed by the mobile platform and its onboard system to perform occultation, to achieve the desired atmospheric weather information.

Referring now to FIG. 6, a flowchart 400 is presented of the major operations performed by the system 300. Initially, at operation 400, each IRIDIUM® satellite 312a,312b (and all other IRIDIUM® satellites) is modified through remotely transmitted wireless signals from the satellite control system 324 to configure it to transmit a GNSS-type signal that includes time and position (i.e., location) information, as indicated at operation 402. At operation 404 the satellites 312a,312b begin transmitting wireless signals that include the time and position information. At operation 406, the mobile platform 314 fixes on to a selected one of the satellites, for example satellite 312a, and begins receiving wireless signals from the satellite 312a using one (or possibly both) of antennas 326 or 328. At operation 408 the processor 338 of the onboard system 332 uses the received position and location information to perform occultation calculations and to generate weather related information therefrom (i.e., temperature, relative humidity, barometric pressure, etc.). At operation 410, the processor 338 outputs the weather related information to the transmitter 336 which transmits it to the desired recipient (such as weather monitoring station 330 or any other mobile platform).

The present system 300 and method of operation thus enables more powerful and more frequent satellite signals from IRIDIUM® satellites to be used to determine important atmospheric information. The system 300 and methodology described herein is especially useful for determining weather information for rapidly changing weather patterns over large bodies of water, where prior developed systems are not able to function, or are not able to provide weather related information in a timely form, or are too costly to operate.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for obtaining weather related information for a portion of the Earth's atmosphere between a mobile platform traversing over a surface portion of the Earth, and at least one satellite from a satellite constellation, the method comprising:

modifying at least one satellite from a constellation of satellites to include time and location information in wireless signals that are transmitted in real time by said one satellite;

using said mobile platform to receive said wireless signals from said one satellite; and using an occultation system carried on said mobile platform to analyze said time and position information to derive real time atmospheric weather related information for a geographic area between said airborne mobile platform and said one satellite.

2. The method of claim 1, further comprising using said mobile platform to transmit said real time atmospheric weather related information to a terrestrial based weather station.

3. The method of claim 1, wherein said modifying at least one satellite comprises using a satellite control system to transmit wireless signals to said one satellite to modify operation of an onboard computer of said one satellite.

4. The method of claim 1, wherein using said mobile platform comprises using one of a jet aircraft and a marine vessel.

5. The method of claim 1, wherein deriving real time atmospheric weather information comprises deriving at least one of precipitable water vapor (PWV), temperature and wave height.

6. The method of claim 1, wherein said using an occultation system comprises using a receiver to receive said wireless signals from said one satellite and to determine a time delay relating to a time of travel of said wireless signals from said one satellite to said mobile platform.

7. The method of claim 6, further comprising using a processor to receive said time delay and performing signal occultation calculations to obtain said atmospheric weather related information.

8. A method for obtaining weather related information for a portion of the Earth's atmosphere between an airborne mobile platform traversing over a body of water on the Earth, and at least one satellite from satellite constellation, the method comprising:

modifying a plurality of satellites from a constellation of orbiting satellites to include time and location information in wireless signals that are transmitted in real time by said constellation of satellites;

transmitting said wireless signals from said constellation of satellites;

using said airborne mobile platform to receive said wireless signals from said constellation of satellites;

using an occultation system carried on said airborne mobile platform to analyze said time and position information, in addition to location information pertaining to a real time location of said airborne mobile platform, and to derive real time atmospheric weather related information for a geographic area between said airborne mobile platform and a given one of said constellation of satellites.

9. The method of claim 8, wherein using said airborne mobile platform comprises using a jet aircraft flying at a cruise altitude over said body of water.

10. The method of claim 8, further comprising using said airborne mobile platform to transmit said real time atmospheric weather related information to a terrestrial weather station.

11. The method of claim 8, further comprising using said airborne mobile platform to transmit said real time atmospheric weather related information to a sea based vessel.

12. The method of claim 8, wherein said using an occultation system comprises using a receiver on said airborne mobile platform to receive said wireless signals and to compute time delay information therefrom relating to a time of travel of said wireless signals from a designated one of said constellation of satellites to said airborne mobile platform.

13. The method of claim 12, wherein said using an occultation system further comprises using a processor in communication with said receiver to receive said time delay information and to calculate therefrom said real time atmospheric weather related information.

14. A system for determining atmospheric weather related information using at least one satellite of a satellite constellation, the system including:

at least satellite modified to transmit time and location data;

a mobile platform having an antenna tuned to receive wireless signals transmitted by said one satellite, said wireless signals including said time and location data;

an occultation system carried by said mobile platform including:

a receiver adapted to receive said wireless signals transmitted from said one satellite and for using said time and location data to determine time delay information relating to a time of travel of said wireless signals from said one satellite to said mobile platform, and location information concerning said one satellite; and a processor adapted to perform occultation calculations using said location information and said time delay information, and to generate therefrom atmospheric weather related information.

15. The system of claim 14, wherein said mobile platform comprises one of an airborne mobile platform and a sea going vessel.

16. The system of claim 14, wherein said atmospheric weather information comprises information relating to at least one of precipitable water vapor (PWV), temperature and wave height.

17. The system of claim 14, wherein said mobile platform comprises a sea going vessel.

18. The system of claim 17, further comprising a weather monitoring station located remote from said mobile platform, and responsive to signals transmitted from said transmitter on said mobile platform.

19. The system of claim 14, further comprising a transmitter carried on said mobile platform for transmitting said atmospheric weather related information to a remote site.

20. The system of claim 14, wherein said antenna is mounted on an underside of a fuselage portion of said mobile platform.

21. The system of claim 14, wherein said antenna is mounted on a crown of a fuselage portion of said mobile platform.

* * * * *